US011683039B1

(12) United States Patent
Syed et al.

(10) Patent No.: US 11,683,039 B1
(45) Date of Patent: Jun. 20, 2023

(54) TCAM-BASED NOT LOGIC

(71) Applicant: DreamBig Semiconductor Inc., San Jose, CA (US)

(72) Inventors: Sohail A Syed, San Jose, CA (US); Hillel Gazit, Palo Alto, CA (US); Hon Luu, San Jose, CA (US); Pranab Ghosh, Pleasonton, CA (US)

(73) Assignee: DreamBig Semiconductor Inc., San Jose, CA (US)

( * ) Notice: Subject to any disclaimer, the term of this patent is extended or adjusted under 35 U.S.C. 154(b) by 0 days.

(21) Appl. No.: 17/710,891

(22) Filed: Mar. 31, 2022

Related U.S. Application Data (60) Provisional application No. 63/168,921, filed on Mar. 31, 2021.

(51) Int. Cl.
*H03K 19/1776* (2020.01)
*G11C 15/04* (2006.01)
(Continued)

(52) U.S. Cl.
CPC ......... *H03K 19/1776* (2013.01); *G11C 15/04* (2013.01); *H03K 5/2472* (2013.01); *H03K 19/20* (2013.01)

(58) Field of Classification Search
None
See application file for complete search history.

(56) References Cited

U.S. PATENT DOCUMENTS

| | | | |
|---|---|---|---|
| 7,643,353 B1 * | 1/2010 | Srinivasan | G11C 15/00 365/49.1 |
| 8,195,873 B2 | 6/2012 | Gazit | |

(Continued)

FOREIGN PATENT DOCUMENTS

WO    WO-1998007160    2/1998

OTHER PUBLICATIONS

Demetriades, Socrates, et al., "An Efficient Hardware-basedMulti-hash Scheme for High Speed IP Lookup", Department of Computer Science University of Pittsburg, (Jun. 2008), 8 pages.

(Continued)

*Primary Examiner* — Anh Q Tran
(74) *Attorney, Agent, or Firm* — Schwegman Lundberg & Woessner, P.A.

(57) ABSTRACT

A NOT logic circuit is provided comprising: one or more memory devices; wherein a first memory address location of the one or more memory devices stores first content data, wherein the first content data includes a first ternary value and a corresponding first priority value, wherein the first ternary value includes a continuous sequence of X-state values that represent a first range of non-X ternary values; wherein a second memory address of the one or more memory device stores second content data that includes a second ternary value and a corresponding second priority value, wherein the second ternary value includes a continuous sequence of non-X state values represent a non-X ternary value that is within the first range of non-X ternary values; an interface is coupled to receive a ternary value from a processing device; comparator circuitry operable to compare a received ternary key with the outputted first ternary value and to compare the received ternary key with the outputted second ternary value; priority encoder logic operable to, return the outputted first priority value on a condition that the received ternary key matches the first ternary value and the received ternary key does not match second ternary value, and return the outputted second priority value on a condition that the received ternary key matches the first ternary value and that the received ternary key matches the second ternary value; and detection logic operable to send a return to the processing device on a condition of a return of the first priority value.

5 Claims, 8 Drawing Sheets

(51) Int. Cl.
*H03K 19/20* (2006.01)
*H03K 5/24* (2006.01)

(56) References Cited

U.S. PATENT DOCUMENTS

| | | | |
|---|---|---|---|
| 9,094,307 | B1 | 7/2015 | Edsall et al. |
| 9,262,312 | B1 | 2/2016 | Gazit et al. |
| 9,306,851 | B1 | 4/2016 | Gazit et al. |
| 9,639,501 | B1 | 5/2017 | Gazit et al. |
| 10,254,968 | B1 | 4/2019 | Gazit et al. |
| 10,318,587 | B1 | 6/2019 | Bosshart et al. |
| 10,778,721 | B1 | 9/2020 | Holbrook et al. |
| 10,887,233 | B2 | 1/2021 | Labonte et al. |
| 2009/0190404 | A1* | 7/2009 | Roohparvar ....... G11C 16/0483 365/49.17 |
| 2015/0006808 | A1* | 1/2015 | Miller ............... G06F 16/90339 711/108 |
| 2017/0040059 | A1 | 2/2017 | Arsovski et al. |
| 2018/0039662 | A1 | 2/2018 | Asai et al. |

OTHER PUBLICATIONS

Meiners, Chad R., et al., "Algorithmic Approaches to Redesigning TCAM Based Systems", Sigmetrics, '08IGMETRICS Jun. 2-6, 2008, Annapolis, Maryland, (Jun. 2008), 2 pgs.
Pagiamtzis, Kostas, et al., "Content-Addressable Memory (CAM) Circuits and Architectures: A Tutorial and Survey", IEEE Journal of Solid-State Circuits, 41(3), (Mar. 2006), 16 pages.
Ravikumar, V. C., et al., "TCAM Architecture for IP Lookup Using Prefix Properties", Published by the IEEE Computer Society 0272-1732/04, (Mar.-Apr. 2004), 10 pages.
Sheu, Jang-Ping, et al., "Efficient TCAM Rules Distribution Algorithms in Software-Defined Networking", IEEE Transactions on Network and Service Management, 15(2), (Jun. 2018), 12 pages.
Song, Yibo, et al., "A Low-power Content-Addressable Memory (CAM) Using Pipelined Search Scheme", ICWET '10: Proceedings of the International Conference and Workshop on Emerging Trends in Technology, (Dec. 2009), 6 pages.
Trinh, Nguyen, et al., "Algorithmic TCAM on FPGA with data collision approach", Indonesian Journal of Electrical Engineering and Computer Science, (Apr. 2021), 89-96.
"U.S. Appl. No. 17/710,678, Corrected Notice of Allowability dated Mar. 30, 2023", 4 pgs.
"U.S. Appl. No. 17/710,678, Corrected Notice of Allowability dated Apr. 10, 2023", 4 pgs.
"U.S. Appl. No. 17/710,678, Notice of Allowance dated Mar. 16, 2023", 19 pgs.
Bremier-Barr, Anat, et al., "Encoding Short Ranges in TCAM Without Expansion: Efficient Algorithm and Applications", SPAA '16, Jul. 11-13, 2016, Pacific Grove, CA, (2016), 35-46.
Liu, Huan, "Efficient Mapping of Range Classifier into Ternary-CAM", Proceedings 10th Symposium on High Performance Interconnects (HOTI '02), (2002), 6 pgs.
Meiners, Chad R., et al., "Bit Weaving: A Non-Prefix Approach to Compressing Packet Classifiers in TCAMs", IEEE/ACM Transactions on Networking, vol. 20, No. 2, (Apr. 2011), 488-500.
Ullah, Inayat, et al., "EE-TCAM: An Energy-Efficient SRAM-Based TCAM on FPGA", Electronics, 7(9), 186, (2018), 15 pgs.
Ullah, Zahid, et al., "E-TCAM: An Efficient SRAM-Based Architecture for TCAM", Circuits, Systems, and Signal Processing, 33, (2014), 3123-3144.
Vegesna, S. M. Srinivasavarma, et al., "A Novel Rule Mapping on TCAM for Power Efficient Packet Classification", ACM Transactions on Design Automation of Electronic Systems, vol. 24, .No. 5, Article 48, (Jun. 2019), 23 pgs.
Zhang, Chaoqin, et al., "RETCAM: An Efficient TCAM Compression Model for Flow Table of OpenFlow", Journal of Communications and Networks, vol. 22, No. 6, (Dec. 2020), 484-491.

\* cited by examiner

| KEY | RULE |
|---|---|

*Fig. 6*

| PRIORITY VALUE | PART NO. |
|---|---|
| 1 | $530_1$ |
| 2 | $530_5$ |
| 3 | $530_1$ |
| 4 | $530_{20}$ |
| ⋮ | ⋮ |
| MAX | EXCEPTION |

TCAM-BASED NOT LOGIC

CROSS-REFERENCE TO RELATED APPLICATION

This application claims priority to U.S. provisional application Ser. No. 63/168,921, filed Mar. 31, 2021, entitled, ALGORITHMIC TERNARY CONTENT ADDRESSABLE MEMORY, which is incorporated herein in its entirety by this reference.

BACKGROUND

Content addressable memory (CAM) is a special type of memory that determines memory storage locations to associate with input data based upon the input data. A typical memory, such as a random access memory (RAM), is accessed based upon memory addresses. In contrast a CAM is accessed based upon content stored at one or more memory addresses. During a read operation of a typical memory, the memory receives an address value as an input and, in response, outputs a data value stored at a memory location corresponding to the received address value. A CAM operates in a different manner. During a read operation of a CAM, the CAM receives as input, content data that may be stored at some location in the CAM, and outputs an indication of whether that data value is present at a CAM address location. The content data received as input to a CAM during a read operation is commonly referred to as a search expression or as a key. During a typical CAM read operation, a CAM searches for stored entries in the CAM that match the key. A typical CAM can compare in parallel each of a plurality of content data values stored within the CAM with a key to determine whether there exists a stored content data value that matches the key and if so, output an indication of the match. Thus, a CAM accesses content (i.e., stored data values) by comparing content stored within the CAM with a key.

Applications of CAM include routing Internet packets, cache memory for microprocessors, and artificial intelligence to name a few examples. Many network devices (e.g., bridges, switches, 5s, gateways, network proxies, network processors), for example, use a ternary CAM for routing operations. A ternary CAM (TCAM) is referred to as ternary because it can store data in any of three different states: logic 0, logic 1 and X. Data having an "X" or "don't care" state is of no relevance to a content search being conducted. Algorithmic RAM-based TCAM typically often uses two-bit values stored in RAM to represent individual ternary states. In other words, each of TCAM logic 0, logic 1, and X is represented in RAM-based TCAM as a different combination of two binary bits.

Figure 1:
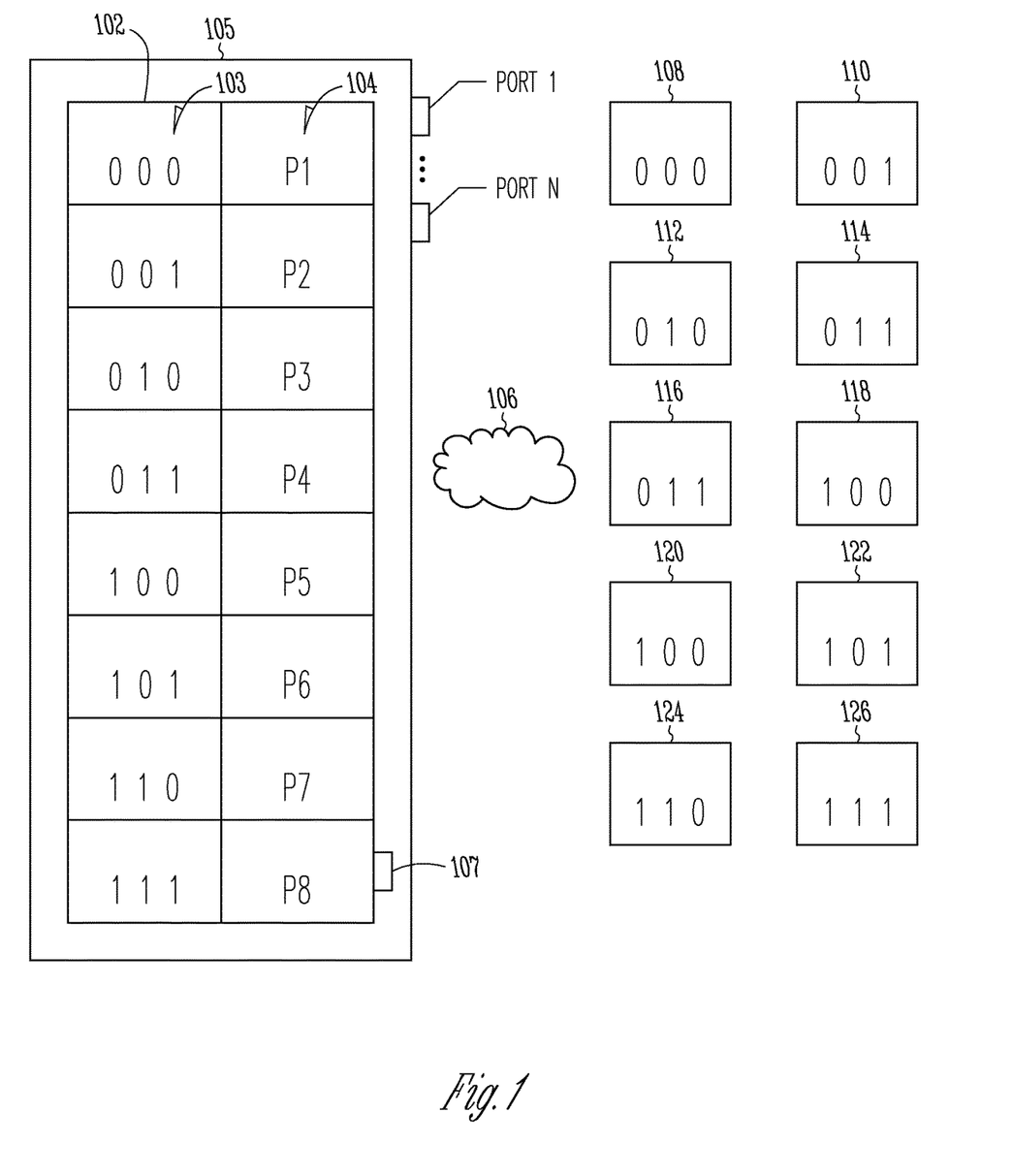
FIG. 1 is an illustrative drawing representing a first example TCAM storing ternary values in a first example pattern.

FIG. 1 is an illustrative drawing representing a first example TCAM 102 storing ternary values in a first example pattern. The TCAM 102 stores eight unique ternary values (000-111) 103. The first example TCAM 102 also stores eight corresponding unique priority values (P1-P8) 104. Each priority value corresponds to a different one of the eight stored values. The first example TCAM 102 is used in an example network device 105 that includes a plurality of ports Port1-PortN. The network device 105 is coupled to a network 106 and can communicate via the ports, Port1-PortN, with other network devices 108-126 coupled to the network 106. A port is a communication endpoint. At a software level, a port is a logical construct that typically identifies a specific process or a type of network service. A port typically is identified for each transport protocol and address combination. Each priority value comprises a unique numerical value. Each priority value corresponds a port of the network device 102. In the example of FIG. 1, each priority value corresponds to a different port. However, there can be a many to one relationship between priority values and ports; different priority values can correspond to the same port. In this illustrative example, each respective stored ternary value corresponds to a network address of a different respective one of the network devices 108-124 as shown. Network device 108 corresponds to network address 000, network device 110 corresponds to network address 001, etc. In operation, in response to a ternary search value received at an input interface 107 of the first example TCAM 102, a search process compares each of the stored ternary values with the received search value to search for a match between the received search value and a stored value. In response to finding a match between the search value and a stored value, a priority value is identified that corresponds to the matching stored value. A message corresponding to the received search value is sent over the network 106, via a port corresponding to the identified priority value, to a network device having a network address corresponding to the matching stored ternary value. For example, assuming the search value is 011, the identified priority value is the fourth priority value P4, the corresponding port is the fourth port Port4. A message corresponding to the example search value 011 is sent over the network 106 via the fourth port Port4 to the network device 114.

Figure 2:
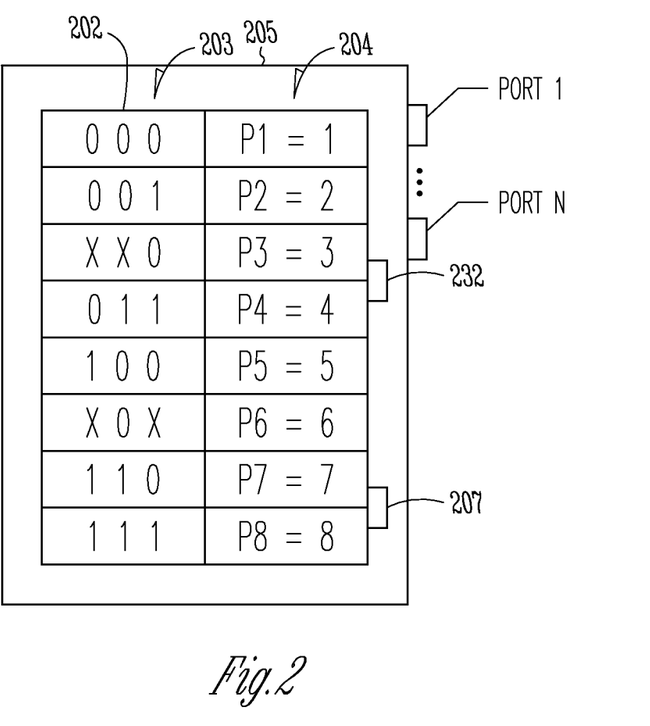
FIG. 2 is an illustrative drawing representing a second example TCAM storing ternary values in a second example pattern.

FIG. 2 is an illustrative drawing representing a second example TCAM 202, within a network device 205, storing ternary values in a second example pattern. The second example TCAM 202 stores eight unique ternary values 203. The second example TCAM 202 also stores eight corresponding unique priority values 204. The second example TCAM 202 stores multiple ternary values that comprise at least one ternary X ("don't care") state that represents both a logic 0 state and a logic 1 state. An example search value received at the input interface 107 of the second example TCAM 202 can match more than one of the stored ternary values. For example, a search value 100 received at the input interface 207, matches stored ternary values XX0, 100, and X0X stored in the second example TCAM 202. In the example of FIG. 2, stored value XX0 corresponds to a third priority value P3. Stored value 100 corresponds to a fifth priority value P5. Stored value X0X corresponds to a sixth priority value P6. On a condition that a search value matches multiple stored values that correspond to multiple priority values, a priority encoder 232 is used to select a priority value associated with the largest numerical value, that corresponds to a matching stored value. For example, assuming that the priority values P1-P8 have associated magnitudes 1-8, respectively, the priority encoder 232 selects priority value P6 since a magnitude six associated with priority value P6 is larger than the respective magnitudes three and five associated with priority values P3 and P5. A message corresponding to the example search value 011 is sent over the network 106 via the sixth port Port6.

In use, a typical TCAM may store thousands of ternary values corresponding to thousands of network devices coupled to a network 106, for example. Thus, a search process ordinarily can involve comparing each one of the thousands of stored ternary values with a received search value. Moreover, a typical TCAM may perform many thousands of searches per second, for example. Thus, use of a typical TCAM can consume significant energy resources and can require significant heat dissipation, for example. One prior solution is to compress TCAM storage by storing one or more ternary values that includes multiple X states to represent multiple ternary values.

Figure 3:
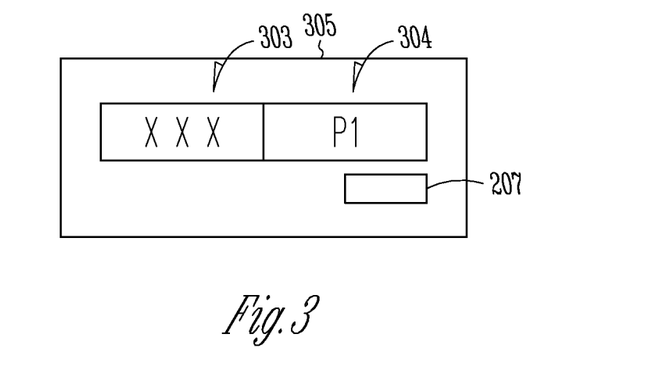
FIG. 3 is an illustrative drawing representing a third example TCAM storing a first example compressed ternary value pattern to represent multiple ternary values.

FIG. 3 is an illustrative drawing representing a third example TCAM 302, within a network device 305, that stores a first example compressed ternary value pattern to represent multiple ternary values. The first example compressed ternary value pattern corresponds to priority value P1. In this example, the compressed ternary value pattern XXX matches each of possible search ternary values 000-111. Thus, the amount storage required to match the eight search values 000-111 is compressed from the eight stored values shown in FIG. 1 to the one stored value shown in FIG. 3. The first example compressed ternary value pattern includes a continuous range of search values from 000 through 111. Consequently, the search process need search only one stored search value instead of eight search values 000-111, and only a single comparison is required to search for a match between any one of search values 000-111 and example the stored value XXX.

A TCAM (not shown) can store a compressed ternary value pattern 0000000XXXXXXXXX that represents a continuous range of search values from $0_{10}$ to $1023_{10}$, for example. In other words, a stored search value pattern 0000000XXXXXXXXX represents a continuous range of search values less than $1024_{10}$. The search value pattern 0000000XXXXXXXXX matches every search value from $0_{10}$ to $1023_{10}$. Thus, the search pattern 0000000XXXXXXXXX can be used to compress $1023_{10}$ stored ternary values to a single stored ternary value.

Figure 4:
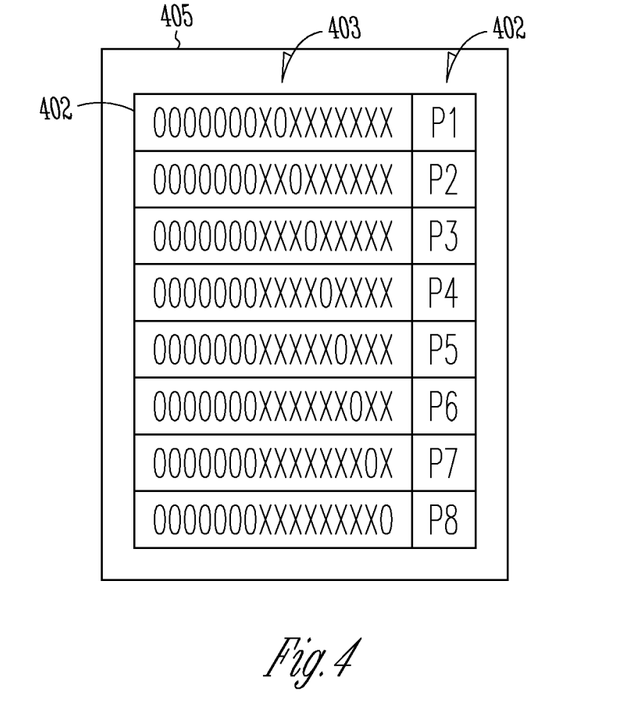
FIG. 4 is an illustrative an illustrative drawing representing a fourth example TCAM that stores multiple partial X state sequences to provide a compressed representation of range of ternary values.

Previous techniques to compress stored values using X states generally have been successful. However, there is a need for improvement in TCAM storage compression that accommodates both a continuous range of search values together with an exception to the range. For example, a range can include all search values less than $1023_{10}$. FIG. 4 is an illustrative an illustrative drawing representing a fourth example TCAM 402, within a network device 405, that stores multiple partial X state sequences to provide a compressed representation of the range less than $1023_{10}$. The X state sequences are referred to as partial herein because each sequence is interrupted by a non-X state value, a ternary 0 state value in this example.

SUMMARY

In one aspect, a NOT logic circuit is provided that includes one or more memory devices. A first memory address location of the one or more memory devices stores first content data. The first content data includes a first ternary value and a corresponding first priority value. The first ternary value includes a continuous sequence of X-state values that represent a first range of non-X ternary values. A second memory address of the one or more memory devices stores second content data that includes a second ternary value and a corresponding second priority value. The second ternary value includes a continuous sequence of non-X state values that represent a non-X ternary value that is within the first range of non-X ternary values. An interface is coupled to receive a ternary value from a network processor. Comparator circuitry is operable to compare a received ternary key with the outputted first ternary value and to compare the received ternary key with the outputted second ternary value. Priority encoder logic is operable to return the outputted first priority value on a condition that the received ternary key matches the first ternary value and the received ternary key does not match second ternary value. The priority logic is operable to return the outputted second priority value on a condition that the received ternary key matches the first ternary value and that the received ternary key matches the second ternary value. Detection logic operable to send a return to the network processor on a condition of a return of the first priority value In another aspect, a method is provided to use one or more memory devices to perform a NOT logic function. First content data is stored at a first memory address location of the one or more memory devices. The first content data includes a first ternary value and a corresponding first priority value. The first ternary value includes a continuous sequence of X-state values that represent a first range of non-X ternary values. Second content data is stored at a second memory address of the one or more memory device stores. The second ternary value includes a continuous sequence of non-X state values represent a non-X ternary value that is within the first range of non-X ternary values. A ternary value is received from a network processor. A first comparator circuit is used to compare the received ternary key with the stored first ternary value. A second comparator circuit is used to compare the received ternary key with the stored second ternary value. The stored first priority value is returned to the network processor on a condition that the received ternary key matches the first ternary value and the received ternary key does not match second ternary value.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 5:
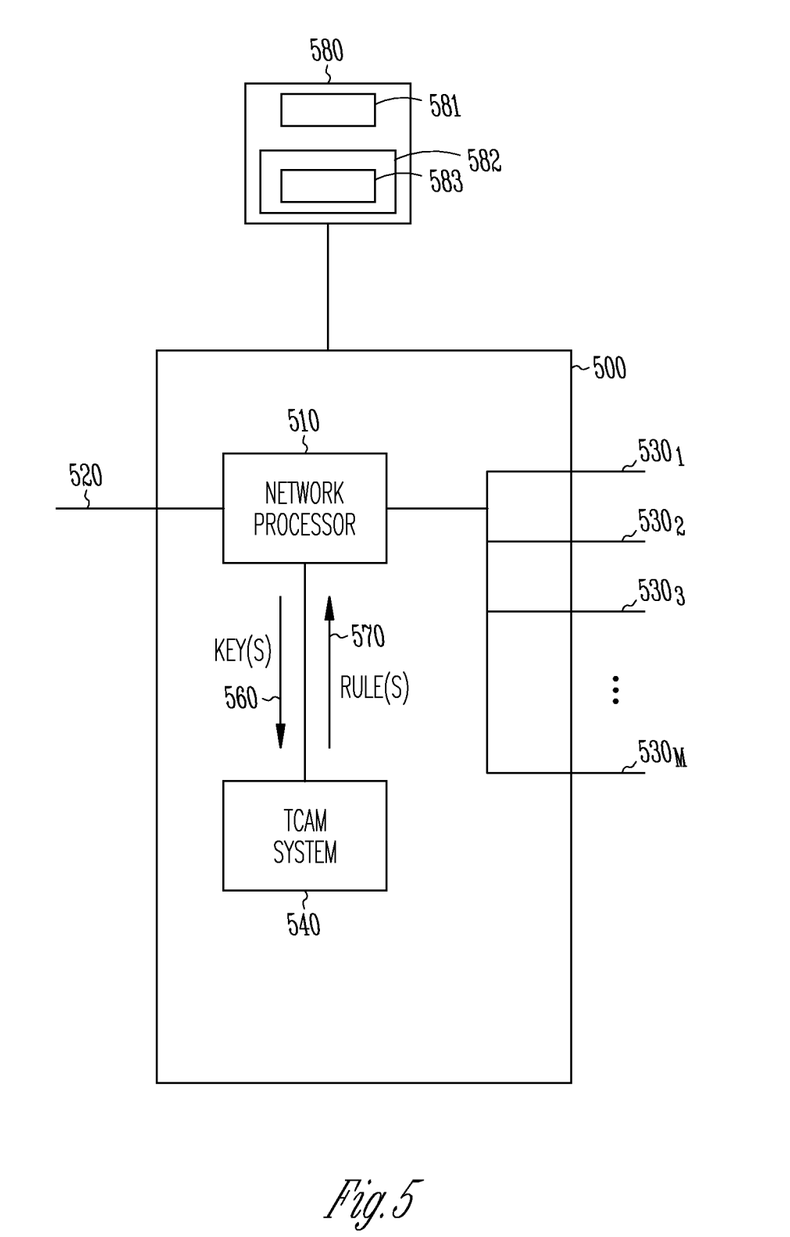
FIG. 5 is an illustrative drawing showing an example network device in accordance with some embodiments.

Network Device:

FIG. 5 is an illustrative drawing showing an example network device 500. The network device 500 can include one or more integrated circuit (IC) devices, a larger device, such as a router or switch, or a combination of these. In some implementations, the network device 500 is a network routing device. In some implementations, the network r device 500 is coupled with a computing machine 580 within a network communications apparatus. The computing machine 580 can include multiple processor circuits 581 coupled to non-transitory memory 582 that includes instructions 583 to configure the computing machine 580 to perform operations described herein. In some implementations, the network device 500 is a network communications apparatus and includes the computing machine 580. The network device 500 can be coupled with a computer network, such as a local area network (LAN) or a wide area network (WAN), and processes data packets that comprise ordered sequences of binary data values.

The network device 500 includes a processing device 510, which receives the packets or portions of packets on an input port or interface 520. In some implementations, the processing device 510 comprises a network processor. The processing device 510 parses incoming packet information to identify relevant data fields that provide information for handling network operations, such as routing and forwarding. The processing device 510 can be coupled with a TCAM-based search engine 540, hereinafter referred to as the "TCAM system" 540, which assists in determining appropriate actions to take in response to receipt of packets over a network. The processing device 510 extracts information from the packets, referred to as key information 560. The key information is used to identify rules that determine appropriate actions to take in response to the received packets. The key information represents data bits within a packet that indicate packet information such as network addresses or portions thereof, port numbers, other header and trailer information, or combinations thereof, for example. The processing device 510 can generate key information, also referred as a "key", that includes ternary value bits, which can have any of three states, logic 0, logic 1, or X ("don't care"), to represent the binary bits extracted from a packet. In general, ternary value bits within a key that represent a logic value 0 or a logic value 1 contribute to identifying a rule that determines an action to take based upon a packet represented by the key, and ternary value bits within a key that represent an X state do not contribute to identifying a rule that determines an action take based upon the packet represented by the key.

The processing device 510 sends ternary key information 560 to the TCAM system 540, which stores rules associated with such key information that indicate corresponding action to take. In an example processing device 510 the rules include priority values that indicate output ports to use to output packets received by the processing device 510. More particularly, in response to receipt of key information 560 corresponding to a packet, the TCAM system 540 returns one or more corresponding priority value rules 570 identified using the key information 560. Based upon a returned priority value, the processing device 510 determines an output port from among output ports $530_1$-$530_m$ on which to forward packet information, for example. Alternatively, the processing device 510 may determine to drop a received packet. The network processor 540 may determine to drop a packet if the TCAM system 540 determines that there is no match for a received key, for example. The TCAM system 540 includes one or more memory devices to store keys in association with corresponding priority values 570. Matches between previously stored keys and keys provided by the processing device 510, in response to received packets, are searched to identify priority values to use to route or switch the received packets.

Figure 6:
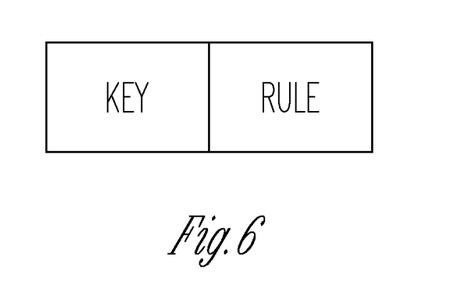
FIG. 6 is an illustrative drawing representing an example content data record that includes a key and an associated priority values searched based upon the key.

FIG. 6 is an illustrative drawing representing an example content data record, stored in a memory device, that includes a key and an associated priority value searched based upon the key.

Figure 7:
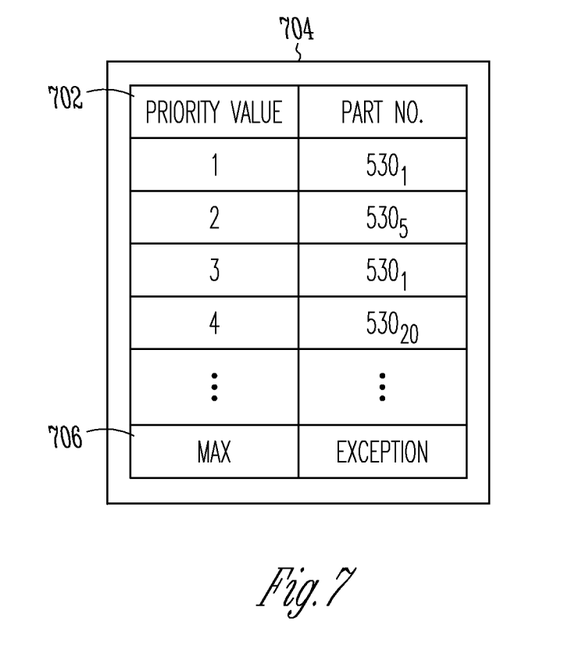
FIG. 7 is an illustrative drawing representing an example information structure stored in a memory device that associates priority values with ports.

FIG. 7 is an illustrative drawing representing an example information structure 702 stored in a memory device 704 at the processing device 510 that associates numerical priority values with output ports $530_1$-$530_m$ described below. The example information structure 702 comprises a table data structure that orders the priority values in a numerically ascending order. An exception priority value, having a numerical value indicated as "max", is not associated with a port and instead is handled as an exception as described more fully below. In an example processing device 510, the exception priority value sets a predetermined threshold value that is the largest numerical magnitude of all priority values associated with ports.

TCAM System

Figure 8:
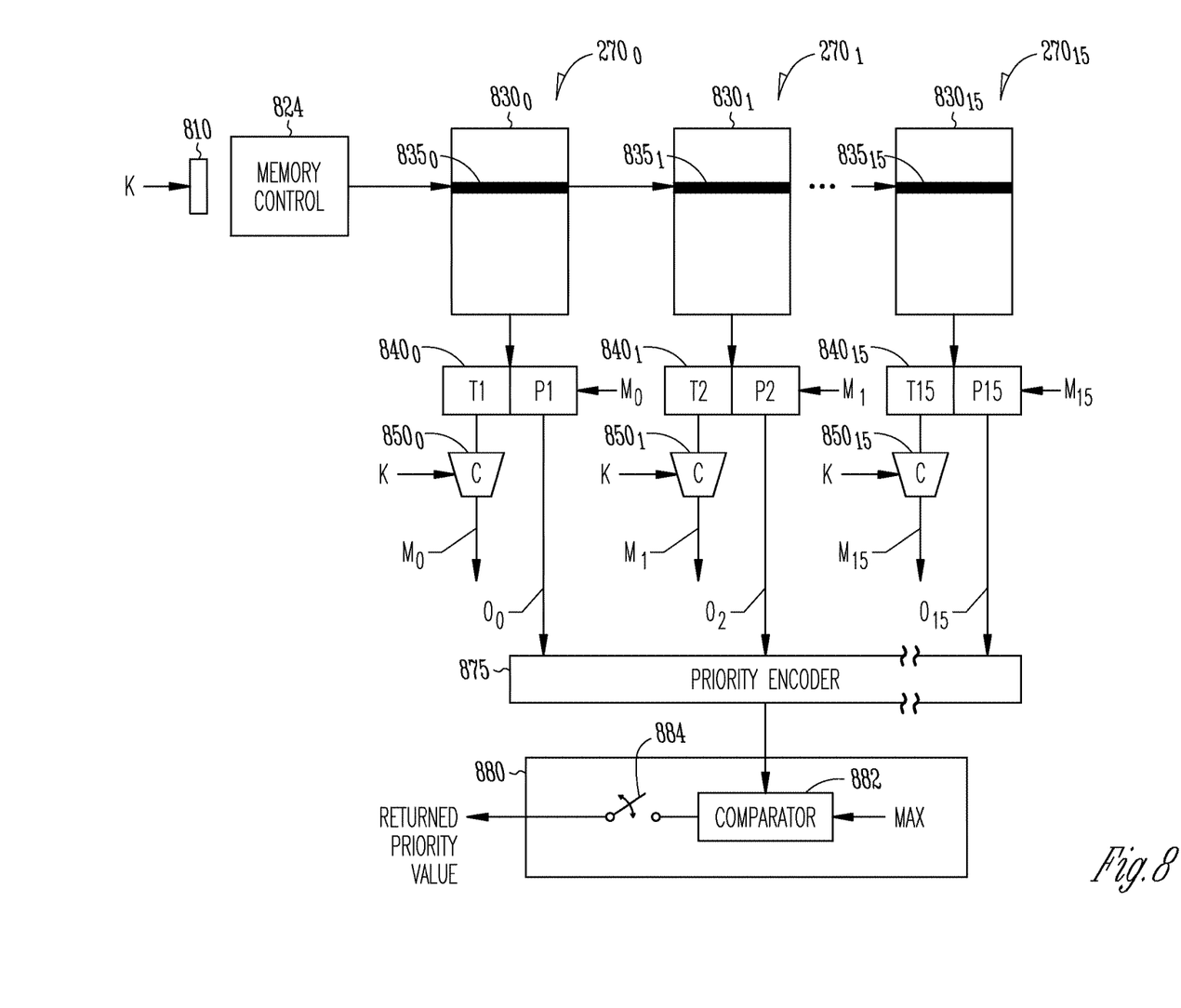
FIG. 8 is an illustrative drawing showing an example TCAM system.

FIG. 8 is an illustrative drawing showing an example TCAM system 540 is implemented using algorithmic TCAM in accordance with some embodiments. The TCAM system 540 includes an input interface 810 on which a ternary key is received, multiple memory modules $870_0$-$870_{15}$, storage control logic circuitry 824, a priority block 875, and detection circuit 880. The example TCAM system 540 includes sixteen memory device modules $870_0$-$870_{15}$, which comprise corresponding memory devices $830_0$-$830_{15}$. The input interface 810 includes a buffer circuit (not shown) to temporarily store a received ternary key. However, the number of memory device modules employed in a TCAM system 540 (e.g., one, two, four, eight, sixteen, etc.) can vary with implementation. The memory devices $830_0$-$830_{15}$ can include integrated circuit RAM memory devices of various types, such Static RAM (SRAM), Dynamic RAM (DRAM), Synchronous DRAM (SDRAM), Flash RAM, etc. For example, each memory device $830_0$-$830_{15}$ can be a 512×256 RAM. In addition, each of memory devices $830_0$-$830_{15}$ can have an associated output buffer circuit $840_0$-$840_{15}$ and comparator circuit $850_0$-$850_{15}$. The memory devices $830_0$-$830_{15}$ and their associated buffers $840_0$-$840_{15}$ and comparators $850_0$-$850_{15}$ operate as memory device modules $870_0$-$870_{15}$.

The memory control logic 824 controls access to the memory devices $830_0$-$830_{15}$. During a write operation, the memory control logic 824 determines a memory location at which to store a ternary value and an associated priority value. Different ternary values and corresponding priority values can be written to the same segment within different memory devices. For example, a memory segment can consist of one or more wordlines. A first ternary value and a corresponding first priority value may be written to a wordline1 $835_0$ in the first memory device $830_0$; a second ternary value and a corresponding second priority value may be written to a wordline1 $835_1$ in the second memory device $830_1$; and a sixteenth ternary value and corresponding sixteenth priority value may be written to a wordline1 $835_{15}$ in a sixteenth memory device $830_{15}$.

During a read operation, the memory control logic 824 can simultaneously access multiple memory locations within two or more of the memory the devices $830_0$-$830_{15}$ to search for a match with a received ternary key value. More particularly, during a read operation, the memory controller 824 causes read access of content data from common memory segments, e.g., wordline1, at one or more of the memory devices. Corresponding output buffer circuits $840_0$-$840_{15}$ receive content data output by the one or more memory devices. The content data includes stored ternary values and corresponding priority value information written previously to the accessed memory segments of the one or more memory devices. Corresponding comparators $850_0$-$850_{15}$ compare stored ternary values output to corresponding buffers $840_0$-$840_{15}$ with a ternary key value received at the input interface 810 and provide signals on corresponding match lines $M_0$-$M_{15}$, indicating whether a match is detected. For example, a first comparator $850_0$ provides a match signal on a first match line $M_0$ indicating whether there is a match between a received ternary key value and a ternary value that is output from memory segment $835_0$ to the output to buffer circuit $840_0$. On a condition that a match is determined, a priority value output to buffer circuit $840_0$ is provided to the detection circuit 880. Thus, a priority value portion of the content data at memory segment $835_0$ is provided on output line $O_0$ to the detection circuit 880 on a condition that the stored ternary value portion of the content data stored at memory segment $235_0$ matches the received key value. Conversely, on a condition that there is not a match between a received ternary key value and a ternary value that is output from memory segment $835_0$ then the priority value portion of the content data at memory segment $835_0$ is not provided on output line $O_0$ to the detection circuit 880.

Similarly, a second comparator $850_1$ provides a match signal on a second match line $M_1$ indicating whether there is a match between a received ternary key value and a ternary value that is output from memory segment $835_1$ to the output to buffer circuit $840_1$. On a condition that a match is determined, a priority value output to buffer circuit $840_1$ is provided to the detection circuit 880. Thus, a priority value portion of the content data at memory segment $835_1$ is provided on output line $O_1$ to the detection circuit 880 on a condition that the stored ternary value portion of the content data stored at memory segment $235_1$ matches the received key value. Conversely, on a condition that there is not a match between a received ternary key value and a ternary value that is output from memory segment $835_1$ then the priority value portion of the content data at memory segment $835_1$ is not provided on output line $O_1$ to the detection circuit 880.

Figure 9:
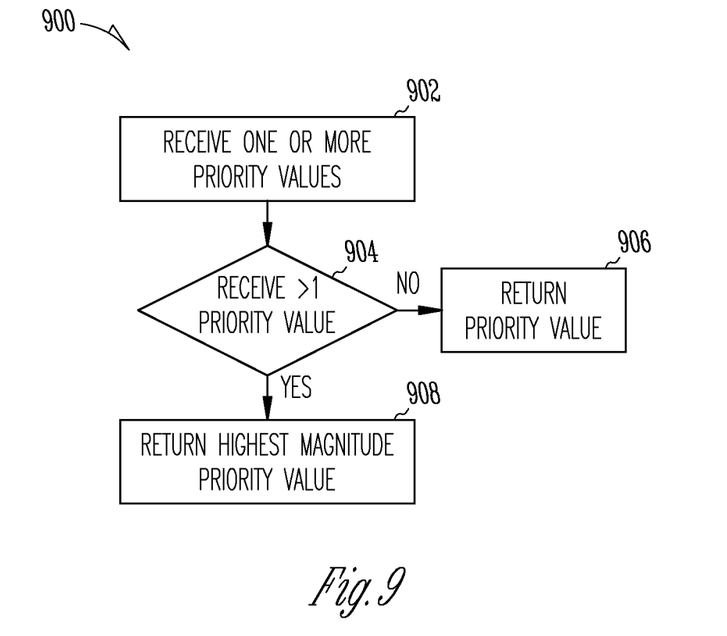
FIG. 9 is an illustrative drawing of an example a priority encoding to select among priority values for return.

FIG. 9 is an illustrative drawing of an example a priority encoder process 900 performed using a priority encoder block 875 used to select among priority values provided on one or more of output lines in response comparison matches. One or more logic circuits are configured to implement operations of the priority block 875. Operation 902 receives one or more priority values provided on one or more output lines $O_0$-$O_{15}$ corresponding to one or matches determined using comparators $850_0$-$850_{15}$. In response to a simultaneous read from multiple common memory segments, e.g., $835_0$-$835_{15}$. It will be appreciated that more than one stored ternary value may match a search key value. Decision operation 904 determines whether there is a single received priority value. On a condition that there is a single priority value, operation 906 selects the received priority value and provides the selected priority value for return to the processing device 510. On a condition that there is more than one received priority value, decision operation selects the priority value having the largest magnitude and provides the selected priority value for return to the processing device 510.

Referring again to FIG. 8, the detection circuit 880 determines whether a priority value provided for return meets an exception condition. An example detection circuit 880 includes digital detector logic that compares a magnitude of a priority value provided for return with a threshold value "max" to determine whether there is a match indicating that the returned priority value is an exception value. An example detection circuit 880 includes a digital comparison circuit 882 to compare a magnitude of the priority value provided for return with a threshold magnitude value that is greater than a magnitude of every other priority value stored within the one or more memory devices $830_0$-$830_{15}$. That is, the "max" magnitude 706 indicated in FIG. 7. On a condition that a priority value provided for return meets the threshold exception condition, the detection circuit 880 block returns of the priority value to cause no return of the priority value to the processing device 510. An example detection circuit 880 includes a switch 884 that opens to block the priority value on a condition that a priority value provided for return meets the exception. On a condition that a priority value provided for return does not meet the threshold exception condition, the detection circuit 880 does not block or cause a no return of a priority value to the processing device 510. An example processing device 510 that receives no return priority value in response to a read performed based upon key value provided by the processing device 510 and may drop a message associated with the key value.

Figure 10:
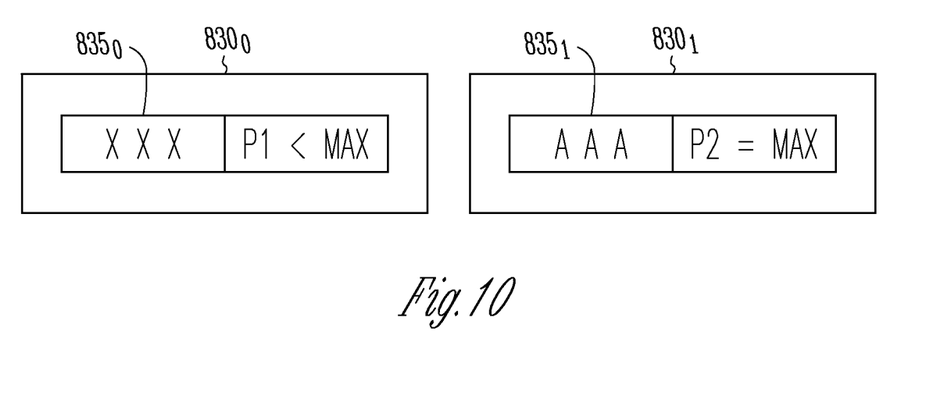
FIG. 10 is an illustrative drawing representing an example first example configuration of the TCAM system to perform an if NOT logic function.

TCAM-Based NOT Logic:

FIG. 10 is an illustrative drawing representing a first example configuration of the TCAM system 540 to perform an if NOT logic function. More specifically, the first memory device $830_0$ stores the example compressed continuous ternary value pattern XXX and the corresponding first priority value P1 at memory segment $835_0$. The second memory device $830_1$ stores the example exception ternary value AAA and a corresponding second priority value P2 at memory segment $835_1$. For compactness of disclosure in this example, it is assumed that the first and second memory devices $830_0$, $830_1$ each store only three ternary values per memory segment $835_0$, $835_1$ and that the received key value also includes only three ternary values. Moreover, details of the TCAM system 540 will be understood from the explanation with reference to FIG. 8 and are not repeated.

In the first example configuration the TCAM system 540 is configured to perform the logic function: if a received ternary key value is NOT AAA, then use a priority value P1. The compressed continuous ternary value pattern XXX defines a continuous range of ternary values. The XXX ternary value pattern is referred to as continuous because there are no non-X state (i.e. ternary logic state 0 or ternary logic 1 state) values intervening between any X values in the continuous sequence. The compressed ternary value pattern represents a continuous sequence of ternary values, 000-111. The exception ternary value AAA is a value included within the defined range 000-111.

The first memory device $830_0$ stores the example compressed continuous ternary value pattern XXX and the corresponding first priority value P1 at memory segment $835_0$. The second memory device $830_1$ stores the example exception ternary value AAA and a corresponding second priority value P2 at memory segment $835_1$. For compactness of disclosure in this example, it is assumed that the first and second memory devices $830_0$, $830_1$ each store only three ternary values per memory segment $835_0$, $835_1$ and that the received key value also includes only three ternary values.

The first priority value P1 comprises a numerical value having a magnitude. The second priority value P2 also comprises a numerical value having a magnitude. The second priority value is also referred to herein as an exception priority value. The second priority value P2 has a magnitude that is larger than a magnitude of the first priority value P1. As explained above, in an example TCAM system 540, the second priority value P2 has the largest magnitude out of all priority values stored in the TCAM system 540.

As explained above with reference to FIG. 8, the read control logic 824 can cause a simultaneous search at memory segment 835$_0$ of memory device 830$_0$ and at memory segment 235$_1$ of memory device 230$_1$ and comparators 850$_0$, 840$_1$ may simultaneously check for respective matches between a search key provided at interface 810 and respective ternary values stored at memory segments 835$_0$, 835$_1$. One or more priority values can be provided on corresponding output lines $O_0$-$O_{15}$ in response to corresponding matches between stored ternary values and a key value received at the input 810. The priority block selects a priority value to provide for return to the processing device 510. The detection circuit determines whether to cause no return of a priority value provided for return.

On a condition that a key value received at input 810 is received having a ternary value AAA, then the received key value will match both the stored value XXX and the stored value AAA. The first comparator 850$_0$ determines a key match with the ternary value XXX stored at memory device 830$_0$ at the memory segment 835$_0$ that also stores the first priority value P1. The second comparator 850$_1$ determines a key match with the ternary value AAA stored at memory device 230$_1$ at the memory segment 835$_1$ that also stores the second priority value P2. The priority block 875 causes the second priority value P2 to be provided for return to the processing device 510. Since the second/exception priority value P2 equals the exception value (max), the detection circuit 880 causes no return of the second priority value P2.

Conversely, on a condition that a key value received at input 810 has a ternary value other than AAA, then the received key value will match only the stored value XXX.

The first comparator 850$_0$ determines a key match with the ternary value XXX stored at memory device 830$_0$ at the memory segment 835$_0$ that also stores the first priority value P1. The second comparator 850$_1$ determines no key match with the ternary value AAA stored at memory device 830$_1$ at the memory segment 835$_1$ that also stores the first priority value P2. The priority block 875 causes the first priority value P1 to be provided for return to the processing device 510. The first memory device 830$_0$ outputs only the first priority value P1. The priority block 875 causes the first priority value P1 to be provided for return to the processing device 510. Since the first priority value P12 does meet the exception condition, the detection circuit 880 does not causes no return of the first priority value P1.

Thus, it will be appreciated that only two ternary values need be stored and that only two comparisons are required to determine whether a received key value does not match a designated key value within a continuous range of key values. One comparison determines that the received key value matches the sequence of X states that span the range. A second comparison determines whether the received key value also matches a designated exception value, e.g., AAA, within the range of the X-state sequence. The match with the X state range identifies a first priority value that can be used to specify a rule, e.g., to specify an output port to use to send a message, and a match with the exception value can be used to negate the rule, e.g., to specify that a message should not be sent for a received key that matches a designated exception value. Moreover, it will be appreciated that a received key can represent a network address, a protocol or a combination thereof, for example.

Figure 11:
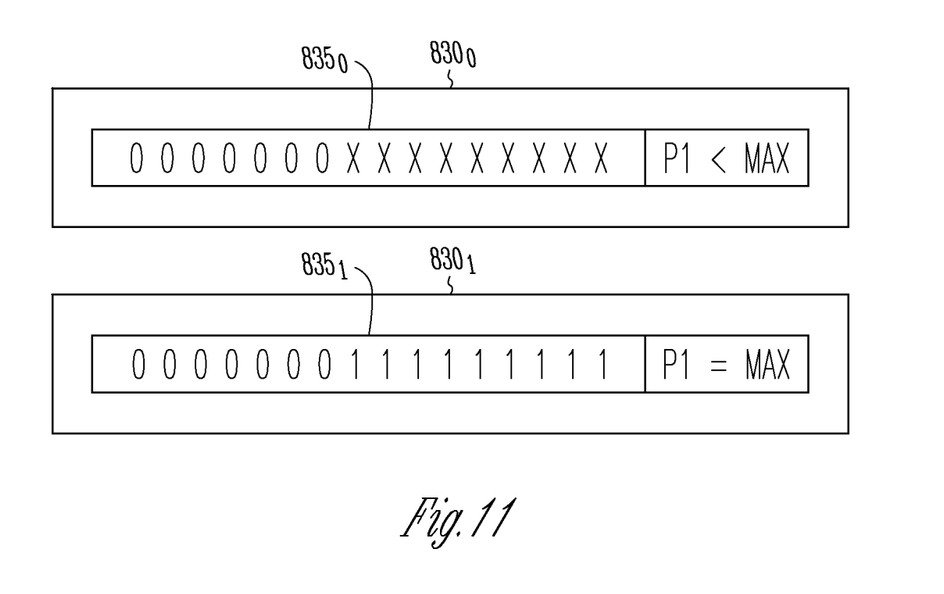
FIG. 11 is an illustrative drawing representing an example second example second configuration of the TCAM system to perform an if NOT logic function.

FIG. 11 is an illustrative drawing representing a second example configuration of the TCAM system 540 to perform an if NOT logic function. The example NOT logic function determines in this example determines whether a condition NOT $1023_{10}$ is met. Details of the TCAM system 540 will be understood from the explanation with reference to FIG. 8 and are not repeated. The first memory device 830$_0$ stores a ternary value that includes a continuous X state ternary value pattern 0000000XXXXXXXXX which matches any value less than $1024_{10}$ and a corresponding first priority value P1, at memory segment 835$_0$. The second memory device 830$_1$ stores an example exception value 0000000111111111 (i.e., $1023_{10}$) and a corresponding second/exception priority value P2, at memory segment 835$_1$. The TCAM system 540, in the second configuration, performs a function, if NOT 0000000111111111, then return the first priority value P1. In this example, the exception value is 0000000111111111 ($1023_{10}$). Also, in this example the second priority value P2 is set to be a largest possible priority value magnitude out of all priority value magnitudes used in the processing device 510.

On a condition that a search value $1023_{10}$ (i.e., 0000000111111111) is received (i.e., the NOT condition is met), the detection circuit 880 causes no return of a priority value. Thus, the detection circuit 880 indicates a match between a received search value and the exception value 0000000111111111 in response to a return the second priority value P2.

Conversely, on a condition of receiving any search value less than $1024_{10}$, other than $1023_{10}$ (i.e., the NOT condition is not met) then detection circuit 880 returns the first priority value P1 to the processing device 510. Thus, the detection circuit 880 indicates a match between a received search value and the continuous X state ternary value pattern 0000000XXXXXXXXX in response to a return the first priority value P1. The above description is presented to enable any person skilled in the art to make and use ternary content addressable memory to perform a NOT logic operation. Various modifications to the examples will be readily apparent to those skilled in the art, and the generic principles defined herein may be applied to other embodiments and applications without departing from the spirit and scope of the invention. For example, although an algorithmic TCAM is disclosed in detail herein, the principles of the invention also apply to cell based TCAM. In the preceding description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A NOT logic circuit comprising:
   one or more memory devices;
   wherein a first memory address location of the one or more memory devices stores first content data, wherein the first content data includes a first ternary value and a corresponding first priority value, wherein the first ternary value includes a continuous sequence of X-state values that represent a first range of non-X ternary values;

wherein a second memory address of the one or more memory device stores second content data that includes a second ternary value and a corresponding second priority value, wherein the second ternary value includes a continuous sequence of non-X state values represent a non-X ternary value that is within the first range of non-X ternary values;

an interface is coupled to receive a ternary value from a processing device;

comparator circuitry operable to compare a received ternary key with the outputted first ternary value and to compare the received ternary key with the outputted second ternary value;

priority encoder logic operable to, return the outputted first priority value on a condition that the received ternary key matches the first ternary value and the received ternary key does not match second ternary value, and return the outputted second priority value on a condition that the received ternary key matches the first ternary value and that the received ternary key matches the second ternary value; and detection logic operable to send a return to the processing device on a condition of a return of the first priority value.

2. The NOT logic circuit of claim 1 further including:

the detection logic operable to send no priority value to the processing device on a condition that of a return of the second priority value.

3. The NOT logic circuit of claim 1 further including:

memory control logic operable to cause output of the first content data from the first memory address location and to cause output of the second content data from the second memory address location.

4. A method to use one or more memory devices to perform a NOT logic function comprising:

storing first content data at a first memory address location of the one or more memory devices, wherein the first content data includes a first ternary value and a corresponding first priority value, wherein the first ternary value includes a continuous sequence of X-state values that represent a first range of non-X ternary values;

storing second content data at a second memory address of the one or more memory device stores, wherein the second content data includes a second ternary value, wherein the second ternary value includes a continuous sequence of non-X state values represent a non-X ternary value that is within the first range of non-X ternary values;

receiving a ternary value from a processing device;

using a comparator circuit to compare a received ternary key with the stored first ternary value;

using the comparator circuit to compare the received ternary key with the stored second ternary value;

sending the stored first priority value to the processing device on a condition that the received ternary key matches the first ternary value and the received ternary key does not match second ternary value.

5. The method of claim 4 further including:

sending no priority value to the processing device on a condition that the received ternary key matches the first ternary value and the received ternary key matches second ternary value.

\* \* \* \* \*

UNITED STATES PATENT AND TRADEMARK OFFICE
CERTIFICATE OF CORRECTION

| | |
|---|---|
| PATENT NO. | : 11,683,039 B1 |
| APPLICATION NO. | : 17/710891 |
| DATED | : June 20, 2023 |
| INVENTOR(S) | : Syed et al. |

It is certified that error appears in the above-identified patent and that said Letters Patent is hereby corrected as shown below:

On the Title Page

In item (72), in "Inventors", in Column 1, Line 1, delete "Sohail A Syed," and insert --Sohail A. Syed,-- therefor In Column 2, item (56) under "Other Publications", Lines 1-2, delete "Hardware-basedMulti-hash" and insert --Hardware-based Multi-hash-- therefor Signed and Sealed this
Fifteenth Day of August, 2023

Katherine Kelly Vidal
*Director of the United States Patent and Trademark Office*